United States Patent
Hesampour et al.

(10) Patent No.: US 10,570,036 B2
(45) Date of Patent: Feb. 25, 2020

(54) PHOSPHORUS PRECIPITATION AND MEMBRANE FLUX IN MEMBRANE BIOREACTORS

(71) Applicant: KEMIRA OYJ, Helsinki (FI)

(72) Inventors: Mehrdad Hesampour, Espoo (FI); Fazlollah Azarnoush, Helsinki (FI); Sakari Halttunen, Espoo (FI)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 15/779,425

(22) PCT Filed: Nov. 22, 2016

(86) PCT No.: PCT/EP2016/078388
§ 371 (c)(1),
(2) Date: May 25, 2018

(87) PCT Pub. No.: WO2017/089330
PCT Pub. Date: Jun. 1, 2017

(65) Prior Publication Data
US 2018/0354824 A1  Dec. 13, 2018

(30) Foreign Application Priority Data
Nov. 27, 2015  (SE) ..................... 1551546

(51) Int. Cl.
*C02F 1/52* (2006.01)
*B01D 65/08* (2006.01)
(Continued)

(52) U.S. Cl.
CPC ............ *C02F 1/5245* (2013.01); *B01D 65/08* (2013.01); *C02F 1/444* (2013.01); *C02F 1/5263* (2013.01);
(Continued)

(58) Field of Classification Search
CPC ............ B01D 2315/06; B01D 2311/12; B01D 21/01; C02F 3/1268; C02F 2303/20;
(Continued)

(56) References Cited

U.S. PATENT DOCUMENTS 4,734,216 A    3/1988  Kelly et al.
7,611,632 B1 *  11/2009  Wang .................. C02F 1/56
                                                    210/698
(Continued)

FOREIGN PATENT DOCUMENTS

EP    2017228 A1      1/2009
EP    2657194 A1 *  10/2013  ........... B01D 61/145
(Continued)

OTHER PUBLICATIONS

Swedish Office Action dated May 30, 2016 for Application No. 1551546-3.
International Search Report dated Feb. 2, 2017 for PCT Application No. PCT/EP2016/078388.

*Primary Examiner* — Claire A Norris
(74) *Attorney, Agent, or Firm* — Moser Taboada

(57) ABSTRACT

The present invention relates to a composition for treatment of wastewaters in a membrane bioreactor comprising a mixture of inorganic coagulants and organic water soluble polymer(s), wherein the inorganic coagulants are selected from iron and/or aluminium containing compounds and the organic water soluble polymers are selected from the group consisting of anionic, cationic, nonionic polymers, polysaccharides and polyphenolic compounds and any combination thereof. The present invention further relates to a method for treating of wastewaters in a membrane bioreactor, and uses thereof.

16 Claims, 1 Drawing Sheet

(51) Int. Cl.
*C02F 3/12* (2006.01)
*C02F 1/56* (2006.01)
*C02F 1/44* (2006.01)
*C02F 101/10* (2006.01)

(52) U.S. Cl.
CPC .............. *C02F 1/56* (2013.01); *C02F 3/1268* (2013.01); *C02F 3/1273* (2013.01); *B01D 2321/168* (2013.01); *C02F 2101/105* (2013.01); *Y02W 10/15* (2015.05)

(58) Field of Classification Search
CPC ........ C02F 1/5245; C02F 1/5272; C02F 3/06; C02F 1/5236

USPC ........................................ 210/631, 728, 723
See application file for complete search history.

(56) References Cited

U.S. PATENT DOCUMENTS

2008/0060996 A1  3/2008  Yoon et al.
2012/0217201 A1  8/2012  Ngo et al.

FOREIGN PATENT DOCUMENTS

JP        2007167779 A     7/2007
WO     WO-2011123970 A1  10/2011
WO     WO-2013160429 A1  10/2013

\* cited by examiner

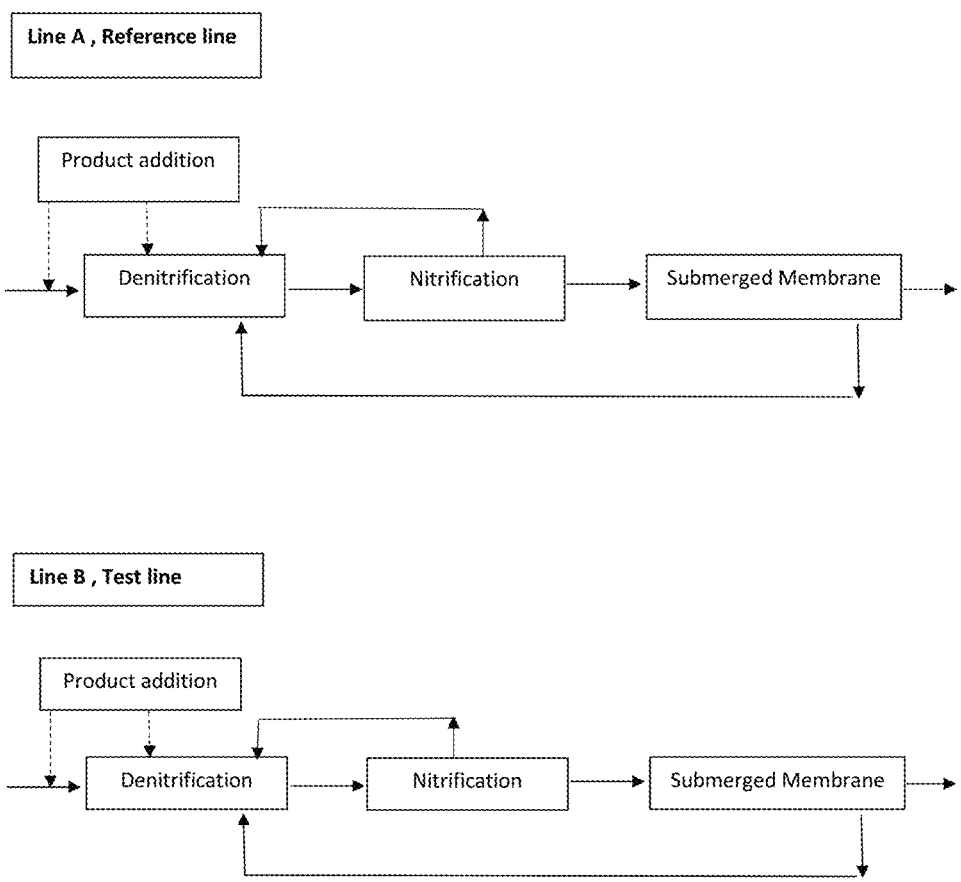

PHOSPHORUS PRECIPITATION AND MEMBRANE FLUX IN MEMBRANE BIOREACTORS

TECHNICAL FIELD

The present invention relates wastewater treatment using membrane bioreactors.

BACKGROUND

Wastewaters may be treated and purified in many different ways. One way to purify waters is to use membrane bioreactors. A process using membrane bioreactor (MBR) combines membrane filtration technique with biological treatment of wastewater. The membrane is a barrier that only allows certain components to pass through it, the permeate. The selectivity of the membrane may be controlled by its pore diameter. The suspended solids and micro-organisms of the biological treatment are separated from the treated water by using suitable membranes, e.g. ultrafiltration or microfiltration membranes. The membranes may be immersed in the biological reactor tank, i.e. integral with the biological reactor tank, or the membranes may be arranged outside the biological reactor in a separate process unit, whereby an intermediate pumping step may be required.

MBR processes may have problems with membrane fouling, which reduces flux through the membrane. Membrane fouling may be due to blockage due to particle sizes or the interaction between the membrane material and the activated sludge liquor comprising living and/or dead micro-organisms, colloidal materials, soluble compounds, etc. To prevent membrane fouling air sparging of the membranes and regular backwashing may be performed. Chemical cleaning of the membranes is also a solution to this. Such steps provide drawbacks as increased process costs, energy consumption and membrane downtime, etc.

It would be desirable to find new ways which allows for better interaction between the used components to reduce defects and drawbacks arising due to their interaction.

There is a demand of solutions for improving membrane performance and water treatment efficiency in a cost effective and environmentally friendly manner.

SUMMARY

The use of MBR as an efficient process in wastewater treatment is increasing. However, it is still not widely used due to higher energy demand for aeration and membrane fouling.

The present invention relates to possibilities to membrane performance and water treatment when using membrane bioreactors. The composition and method according to the present invention provides improved precipitation of phosphorous, and a higher permeate flux in membrane bioreactors. The composition according to the present invention is a blend product that has a multi functionality role in membrane bioreactors (MBR).

Addition of chemicals in influent of the membrane bioreactor is considered as an option to improve the general performance of operation. Inorganic coagulant and organic water soluble polymer are considered suitable chemicals to be used for this purpose.

Organic water soluble polymer seems not to affect phosphorous and nitrogen removal to a large extent and mainly affects permeability of the membrane while inorganic coagulants seems to be efficient in increasing the phosphorous removal but not against of flux decline. The present composition relates to a combination of the effects. The present invention relates to a blend product of inorganic coagulant and organic water soluble polymer and the use in water treatment with membrane bioreactors.

The wastewaters to be treated may be chosen from municipal and industrial wastewaters.

SHORT DESCRIPTION OF THE DRAWINGS

FIG. 1 shows a schematic of an embodiment according to the present invention, which includes an MBR process with membrane submerged and denitrification and nitrification steps.

DETAILED DESCRIPTION

One object of the present invention is to provide a composition for treatment of wastewaters in a membrane bioreactor comprising a mixture of inorganic coagulant(s) and organic water soluble polymer(s), wherein the inorganic coagulants are selected from iron and/or aluminium containing compounds and the organic water soluble polymers selected from the group consisting of anionic, cationic and nonionic polymers and any combination thereof. The mixture of inorganic coagulant and organic water soluble polymer is preferably in liquid form. According to one embodiment the present composition may be in liquid form, preferably the composition is an aqueous composition.

The organic water soluble polymer(s) may be anionic polymer(s). The anionic polymers may be selected from polymers based on compounds selected from the group acrylamide (AMD), (2-acrylamido-2-methyl-1-propanesulfonic acid) (AMPS) and acrylic acid (AA) and any combination thereof; preferably polymers based on the combination of acrylamide (AMD) and (2-acrylamido-2-methyl-1-propanesulfonic acid) (AMPS) and/or the combination of acrylic acid (AA) and (2-acrylamido-2-methyl-1-propanesulfonic acid) (AMPS).

The organic water soluble polymer(s) may be cationic polymer(s). If cationic polymers are used, the cationic polymers may be selected from the group cationic poly acrylamide, poly (diallyldimethylammonium chloride), polyamine, melamine-formaldehyde resin, and polydicyandiamide and any combination thereof. The cationic polyacrylamide may be a copolymer of acrylamide and a cationic monomer or several of them, such as anyone or any combination of acryloyloxy ethyltrimethyl ammonium chloride, methacryloyloxy ethyltrimethyl ammonium chloride, acrylamido propyltrimethylammonium chloride and methacryl amidopropyltrimethyl ammonium chloride.

The organic water soluble polymer(s) may be nonionic polymer(s), wherein the non-ionic organic water soluble polymer may be selected from polymers based on compounds comprising acrylamide (AMD).

It is to be noted that polymers of a selected included monomer, e.g. acrylamide, may be provided in different (ionic) forms, e.g. anionic, cationic and nonionic forms. The use of different comonomers may influence the ionic forms.

Alternatively, the organic water soluble polymer may be polysaccharides and/or polyphenolic compounds and any combination thereof. The polysaccharides may be selected from the group cellulose, starch, chitin and chitosan compounds and any combination thereof. The polyphenolics may be selected from the group tannins and lignin and any combination thereof.

If anionic polymer(s) is used, the amount of active anionic polymer in the composition is about 0.01-40 wt %, preferably 0.01-20 wt %, most preferably 0.01-0.6 wt %.

If cationic polymer(s) is used, the amount of active cationic polymer in the composition is preferably about 0.01-40 wt %, preferably 0.01-20 wt %, most preferably 0.01-0.6 wt %.

If nonionic polymer(s) is used, the amount of active nonionic polymer in the composition is preferably about 0.01-40 wt %, preferably 0.01-20 wt %, most preferably 0.01-0.6 wt %.

If polysaccharides and/or polyphenolic compounds and any combination thereof compounds are used, the amount of active polymer in the composition is preferably about 0.01-40 wt %, preferably 0.01-20 wt %, most preferably 0.01-0.6 wt %.

If a combination of any of the above mentioned polymers, i.e. selected from anionic, cationic, nonionic polymers, polysaccharides and polyphenolic compounds, is used the concentration of active polymer(s) in any combination thereof is preferably about 0.01-40 wt %, preferably 0.01-20 wt %, most preferably 0.01-0.6 wt %.

The inorganic coagulants, the iron and/or aluminium containing compounds, may be selected from the group consisting of aluminium sulfate, polyaluminium sulfate, aluminium chloride, polyaluminium chloride, polyaluminium chlorosulfate, polyaluminium hydroxyl chlorosulfate, aluminium chlorohydrate, sodium aluminate, ferric sulfate, polyferric sulfate, ferric chloride, ferric chloride sulfate, polyferric chloride, ferrous sulfate, ferrous chloride sulfate, ferrous chloride, aluminium triformate, polyaluminium formate and polyaluminium nitrate and any combination thereof. The inorganic coagulants are preferably in the form of a solution, i.e. in liquid form. The amount of metal, i.e. iron and/or aluminium, and any combination thereof in the inorganic coagulant may be about 1-15 wt %, and preferably about 4-14 wt %.

Another object of the present invention is to provide a method for treating of wastewaters in a membrane bioreactor, comprising the steps of providing a stream of wastewater into a membrane bioreactor, adding a composition according to the present invention to the wastewater before and/or into the membrane bioreactor, allowing reaction of the composition and wastewater in a biological treatment step of the membrane bioreactor, and separating the wastewater by using a membrane of the membrane reactor and obtaining a clean water permeate, i.e. a clean outflow of water.

The membrane separation results in a purified effluent obtained after passage of the membrane, and retained sludge, which is the matter not able to pass the membrane.

A membrane bioreactor, MBR, process combines membrane filtration technique with biological treatment of wastewater. The suspended solids and microorganisms of the biological treatment are separated from the treated water by using suitable membranes, e.g. ultrafiltration or microfiltration membranes. The membranes may either be immersed in the biological reactor tank, i.e. integral with the biological reactor tank (referred to as submerged), or the membranes may be arranged outside the biological reactor at a separate process unit (referred to as side stream), whereby an intermediate pumping step may be required.

It is to be noticed that the MBR process may be performed under aerobic and/or anaerobic conditions.

Different biological purification steps may be included in the membrane bioreactor process. Examples of such are nitrification and denitrification, organic carbon removal steps. These may be included in the membrane bioreactor process as a whole.

The nitrification process involves biological oxidation of ammonia or ammonium to nitrite followed by the oxidation of the nitrite to nitrate. Nitrification is an aerobic process performed by microorganisms.

The denitrification process is a microbially facilitated process of nitrate reduction which may finally result in molecular nitrogen ($N_2$). In general, it occurs under anoxic conditions.

The organic carbon removal step removes organic materials. This step can be aerobic or anaerobic. An aerobic step produces $CO_2$, water and biomass. An anaerobic step produces $CH_4$ and treated biomass.

The present composition may be added to the wastewater to be treated before, i.e. the inflow of the MBR, and/or added into the MBR. If the composition is added into the MBR it preferably is added to the bioreactor tank in the biological treatment step of the MBR.

The present composition may be added with the wastewater to be treated before, into and/or after a denitrification step of the membrane bioreactor (MBR).

The present composition may be added before, into and/or after a nitrification step of the membrane bioreactor (MBR).

The present composition may be added before, and/or into an organic carbon removal step of the membrane bioreactor (MBR).

In one embodiment the denitrification step is followed by the nitrification step of the membrane bioreactor (MBR).

If denitrification and nitrification steps are used in the MBR process, it may be preferred that part of the treated wastewater in the nitrification step is recycled back to a preceding denitrification step. Optionally also, at least some part of the sludge retained at the membrane filtration is recycled back to a preceding denitrification step (having a subsequent nitrification step). It is to be noted that the composition according to the present invention may be added at any position chosen from before, at or after the optional denitrification, before, at or after the optional denitrification, between the optional denitrification and nitrification, upon entry of biological treatment step of the MBR, and to biological treatment step of the MBR, or any combination thereof. As the optional biological purification steps of the MBR process are only optional, the composition may be added before or into the MBR, meaning added before and/or to the biological treatment step of the MBR. The membrane bioreactor may comprise a submerged membrane or side stream membrane.

The composition according to the present invention may be added to the wastewater to be treated in a dosage of about 1-1000 mg/l, preferably 30-250 mg/l, preferably 40-150 mg/l. It is to be noticed that the dosage is linked to the inflow of wastewater.

The present composition may be added continuously or intermittently to the stream of wastewater. A continuous addition keeps the reaction improved over time. However, it has been found that by an intermittent addition positive effects are also observed, in particular if some part of the obtained sludge from the membrane separation is reintroduced into the wastewater treatment process.

Thus, the retentate, the material retained at the membrane of the membrane bioreactor, i.e. the sludge, may be, fully or partially, recycled back into the stream of wastewater to be treated using the MBR. If a nitrification step and/or denitrification step is present in the MBR process the recirculation of retentate from the membrane may be forwarded to at least one of such preceding steps, preferably the first one in the process line, preferably the denitrification step.

The present invention provides use of the present composition for treatment of wastewater in a membrane bioreactor (MBR). Further, the present invention provides use of the present method for treating municipal or industrial wastewater.

EXAMPLE

The composition according to the present invention was tested in a pilot plant at local municipal wastewater treatment plant for about three weeks. The pilot plant had two parallel lines and the influent flow to each line was 1.5 m³/h. The pilot scheme is presented in FIG. 1.

The present composition was dosed before or directly into denitrification tank. The present composition was added a few times per day in line B with dosage of about 80 ppm while in the other line a reference product comprising iron sulfate was added continuously at dosage rates of 50 and 150 mg/l respectively.

Results

The results showed that even intermittent addition of new product improves the water treatment effect and performance of the membrane. The phosphorus removal was 84% compared to 83% for reference line. The total nitrogen removal was 42% for 80 ppm of present composition while it was 33% for 150 ppm of reference product. Despite a much higher addition of the reference product the effect of the present composition is considerably more efficient. The permeate flux upon use of the present composition compared with no addition of chemicals increased from 160 to 340 l/(m² h bar), resulting in 112% increase in membrane flux. The permeate flux was only increased 16% for reference line.

TABLE 1

| Product | Dosage, mg/l | Phosphorous removal, % | Total nitrogen removal, % | Increase in membrane flux, % |
|---|---|---|---|---|
| Present composition | 80 | 84 | 42 | 112 |
| Reference product | 50 | 83 | | |
| Reference product | 150 | | 33 | 16 |

As can be seen from the results the present composition and method improves the membrane performance and water treatment efficiency.

The invention claimed is:

1. A premade blend product composition effective for precipitating phosphorus in wastewaters and facilitating membrane flow in a membrane bioreactor comprising a mixture of inorganic coagulant and organic water soluble polymer, wherein the inorganic coagulant is selected from iron and/or aluminium containing compounds and the organic water soluble polymer is selected from the group consisting of anionic polymers, wherein the anionic organic water soluble polymer(s) is selected from polymers of polymerized acrylamide (AMD), (2-acrylamido-2-methyl-1-propanesulfonic acid) (AMPS) or acrylic acid (AA), or any combination thereof.

2. The blend product composition according to claim 1, wherein the iron and/or aluminium containing compounds are selected from the group consisting of aluminium sulfate, polyaluminium sulfate, aluminium chloride, polyaluminium chloride, polyaluminium chlorosulfate, polyaluminium hydroxychlorosulfate, aluminium chlorohydrate, sodium aluminate, ferric sulfate, polyferric sulfate, ferric chloride, ferric chloride sulfate, polyferric chloride, ferrous sulfate, ferrous chloride sulfate, ferrous chloride, aluminium triformate, polyaluminium formate and polyaluminium nitrate and any combination thereof.

3. The blend product composition according to claim 1, wherein the anionic organic water soluble polymer(s) is selected polymers of polymerized i) acrylamide (AMD) and (2-acrylamido-2-methyl-1-propanesulfonic acid) (AMPS) and/or ii) acrylic acid (AA) and (2-acrylamido-2-methyl-1-propanesulfonic acid) (AMPS).

4. The blend product composition according to claim 1, wherein the amount of active polymer, selected from anionic polymers, in the composition is about 0.01-40 wt %.

5. The blend product composition according to claim 1, wherein the amount of metal in the form of iron and/or aluminium in inorganic coagulant is about 1-15 wt %.

6. The blend product composition according to claim 4, wherein the amount of active polymer, selected from anionic polymers, in the blend product composition is 0.01-20 wt %.

7. The blend product composition according to claim 6, wherein the amount of active polymer, selected from anionic polymers, in the blend product composition is 0.01-0.6 wt %.

8. The blend product composition according to claim 5, wherein the amount of metal in the form of iron and/or aluminium in inorganic coagulant is about 4-14 wt %.

9. A method for treating of wastewaters in a membrane bioreactor, comprising the steps of
   providing a stream of wastewater into a membrane bioreactor,
   adding a blend product composition according to claim 1 to the wastewater before and/or into the membrane bioreactor,
   allowing reaction of the blend product composition and wastewater in a biological treatment step(s) of the membrane bioreactor
   separating the wastewater by using a membrane of the membrane reactor and obtaining a clean water permeate.

10. The method according to claim 9, wherein the blend product composition is added to the wastewater in a bioreactor tank in the biological treatment step(s) of the membrane reactor.

11. The method according to claim 9, wherein the membrane bioreactor comprises a submerged membrane or side stream membrane.

12. The method according to claim 9, wherein the blend product composition is added to the wastewater in a dosage of about 1-1000 mg/l of wastewater to be treated.

13. The method according to claim 12, wherein the blend product composition is added to the wastewater in a dosage of 30-250 mg/l of wastewater to be treated.

14. The method according to claim 13, wherein the blend product composition is added to the wastewater in a dosage of 40-150 mg/l of wastewater to be treated.

15. The method according to claim 9, wherein the blend product composition is added continuously or intermittently to the stream of wastewater to be treated.

16. The method according to claim 9, wherein for treating municipal or industrial wastewater.

* * * * *